United States Patent
Zhang (10) Patent No.: US 7,944,832 B2
(45) Date of Patent: May 17, 2011

(54) METHOD AND DEVICE FOR REALIZING CONTENT FLOWING ON P2P NETWORK

(76) Inventor: Yongmin Zhang, Guangdong (CN)

(*) Notice: Subject to any disclaimer, the term of this patent is extended or adjusted under 35 U.S.C. 154(b) by 571 days.

(21) Appl. No.: 12/297,738

(22) PCT Filed: Apr. 21, 2004

(86) PCT No.: PCT/CN2006/000770
§ 371 (c)(1),
(2), (4) Date: Oct. 20, 2008

(87) PCT Pub. No.: WO2007/121612
PCT Pub. Date: Nov. 1, 2007

(65) Prior Publication Data
US 2009/0103439 A1  Apr. 23, 2009

(51) Int. Cl.
*H04L 12/28* (2006.01)
(52) U.S. Cl. ........................................... 370/233
(58) Field of Classification Search ............... 370/233, 370/473
See application file for complete search history.

(56) References Cited

U.S. PATENT DOCUMENTS

| | | | | |
|---|---|---|---|---|
| 7,729,376 B2* | 6/2010 | Klausberger et al. | ......... | 370/468 |
| 2002/0162109 A1* | 10/2002 | Shteyn | ............... | 725/87 |
| 2004/0107242 A1* | 6/2004 | Vert et al. | ........... | 709/203 |

* cited by examiner

*Primary Examiner* — Ricky Ngo
*Assistant Examiner* — Ben H Liu
(74) *Attorney, Agent, or Firm* — Global IP Services; Tianhua Gu (57) ABSTRACT

This invention relates to a method and device for realizing content flowing continuously on P2P network, which is used for dividing the content to be transmitted into a plurality of blocks; detects connection state of all nodes performing the content transmission, calculates an upload rate coefficient of each node, determines the selected upload rate coefficient according to the upload rate coefficient, and determines a transmission rate of the content stream and the number of the content stream transmitted by a content source, the content source distributes the content blocks being able to be transmitted by each node proportionally according to the selected upload rate coefficient of each node; and transmits the distributed content blocks to the corresponding nodes respectively, and controls the node to re-transmit the received content block to other nodes. The present invention can utilize the resource more reasonably and fully.

16 Claims, 5 Drawing Sheets

METHOD AND DEVICE FOR REALIZING CONTENT FLOWING ON P2P NETWORK

CROSS REFERENCE TO RELATED PATENT APPLICATION

The present application is the US national stage of PCT/CN2006/000770 filed on Apr. 21, 2006, which claims the priority of the PCT/CN2006/000770 filed on Apr. 21, 2006, which application is incorporated herein by reference.

TECHNICAL FILED

This invention relates to computer network, in particular to a method and device for realizing content flowing continuously on P2P network.

BACKGROUND OF THE INVENTION

In the earlier P2P transmission, Application Layer Multicast (ALM) distribution tree technology is adopted, in which, medial nodes redistribute content and leaf nodes receive the content. This method is troubled with two problems. The loads undertaken by the medial nodes are very heavy, while the upload bandwidth of the leaf nodes is not utilized to distribute the contents.

One improved method is that the source nodes divide the content into a plurality of blocks, and then respectively transmit them to each node. Each node then retransmits them to other nodes. The improvement of this method is that each node (possibly all the nodes) are used for upload, but the difference of the upload bandwidth between each node is not yet used.

A further improved method is that it also divides the content into a plurality of blocks. The number of the blocks redistributed by a certain node is proportional to the upload bandwidth of the node. The node with larger upload bandwidth can redistribute many blocks, while the node with smaller upload bandwidth can redistribute less blocks. This method makes full use of the upload bandwidth of each node. But further improvement is also required, because this method is unfair. It may increase the unnecessary load for certain nodes. For example, if a content download requires bandwidth B, herein three nodes can undertake the task, and then totally 3B of upload bandwidth is required to provide transmission for them. Yet their base upload bandwidths are respectively B, 0B and 5B. Therefore, they respectively contributed 0.5B, 0B and 2.5B upload bandwidth. Obviously, there is no necessity for the node contributed 2.5B to provide another more 0.5B upload bandwidth for a node with the capability. Generally, it is recommended to help the node with difficulty, but not the nodes with the capability in a way of robbing the rich.

On the other hand, download of a group of users in P2P transmission requires the support of corresponding upload. In a certain period, download summation equals to the upload summation. Total upload bandwidth should be larger than the total bandwidth required for download. When the total bandwidth of upload is not satisfied, there will be no way to download. Therefore, the method for controlling transmission rate and traffic is required.

SUMMARY OF THE INVENTION

This invention mainly aims to solve the existing technical problems, and provides a method and device for realizing content flowing continuously on P2P network to achieve a more reasonable and full use of the source of each node.

For achieving the objectives mentioned above, this invention discloses a method for realizing content flowing continuously on P2P network consisting of the steps: A1. Dividing the content to be transmitted into different blocks;

B1. Detecting connection state of all nodes transmitting the content, including a maximum upload rate permitted for content transmission of each node, wherein calculating the upload rate coefficient $MU_j$ of each node, in which the said upload rate coefficient $MU_j$ equals to the maximum upload rate permitted for content transmission divided by the base rate $U_{bass}$; determining the selected upload rate coefficient $U_j$ of each node, based on the upload rate coefficient $MU_j$, in which j=1,2, ... N, N indicates the number of nodes transmitting the content and determining transmission rate D of the content stream and the number L of the content stream transmitted from the content source, herein, the said transmission rate D of the content stream and transmitted content stream number L of the content source can be variable or fixed depending on different conditions, the said selected upload rate coefficient $U_j$ simultaneously satisfies the following two formulas:

$$(U_1 + \ldots + U_N)^* U_{bass} + L^* D \geq f(N^*D)$$

$$U_j \leq MU_j$$

wherein, f(N*D) means the function of N*D, which is the bandwidth required for total download; and D≦maximum rate of content stream transmission used by the content source when transmitting one content stream;

L*D≦sum of maximum upload bandwidth for the content transmission provided by all the nodes of the content source C1. The content source distributes the content blocks being able to be transmitted by each node proportionally according to the selected upload rate coefficient of each node;

D1. The content source respectively transmits the distributed content blocks to the corresponding nodes at the L*D rate, and controls the nodes to retransmit the content blocks received to the other nodes.

In step C1 and D1, the nodes transmit the content blocks according to the selected upload rate coefficient.

In step B1, the selected upload rate coefficient $U_j$ of each node is determined based on the following conditions: select $U_j = MU_j$ when $MU_j^* U_{bass} \leq D$; when $MU_j^* U_{bass} > D$, the selected $U_j$ should satisfy $U_j^* U_{bass} \geq D$.

When $(MU_1 + \ldots + MU_N)^* U_{bass} + L^* D \geq f(N^*D)$ and with the original transmission rate and the network upload bandwidth of the content source, the said step D1 includes the following steps:

D11. Controlling the nodes which selected upload rate coefficient is larger than or equal to 1 and with the capability of uploading the content blocks to distribute one block;

D12. Calculating the residual selected upload rate coefficient of each node: the said residual selected upload rate coefficient equals to the distributed content block number of this node subtracted from the selected upload rate coefficient;

D13. If there are residual content blocks to be uploaded, performing step D14;

D14. Controlling the nodes which residual selected upload rate coefficient is larger than or equal to 1 and with the residual upload capability block to distribute one block;

D15. Repeating to perform step D12-D14 until all the content blocks are distributed.

In the steps mentioned above, when $(MU_1 + \ldots + MU_N)^* U_{bass} + L^* D \geq f(N^*D)$ and with the original transmission rate and the network upload bandwidth of the content source, the said step D1 includes the following steps:

D11'. Calculating the bandwidth coefficient $SU_j$ which is satisfied the requirement for its downloading as possible: $SU_j=MU_j$ when $MU_j*U_{bass} \leq D$, $SU_j=D/U_{bass}$ when $MU_j*U_{bass}>D$;

D12'. Calculating $U_j'$ according to the formula $U_j'=(MU_j-SU_j)$/sum of residual upload rate coefficient for all the members * the number of residual blocks to be uploaded;

D13'. Calculating $U_j'$ according to the formula $U_j'=U_j'+SU_j$;

D14'. Member j (j=1, 2, . . . , N) distributes the content blocks with $U_j$.

For real-time knowing the connection state of each node and regulating the transmission parameter in time, in step B1, regularly detecting the connection state of each node, and calculating the selected upload rate coefficient $U_j$, transmission rate D of the content stream and the number L of the transmitted content stream from the content source.

For server's timely learning of problem during transmission and accordingly changing the transmission parameter, B1 consists of the following steps: by using Quality of Service, when problem is detected during transmission, detecting the connection state of each node, and calculating the selected upload rate coefficient $U_j$, transmission rate D of the content stream and the number L of the transmitted content stream from the content source.

The transmission rate D of the content stream and the number L of the content stream transmitted from the content source can be variable or fixed depending on different conditions, the calculating of the said transmission rate D of the content stream and the number L of the content stream transmitted from the content source includes the following steps:

A2. Calculating the range of the said transmission rate D of the content stream and the number L of content stream transmitted from the content source by using the condition that "D$\leq$maximum rate of content stream transmission used by the content source when transmitting one content stream" and "L*D$\leq$maximum upload bandwidth summation for the content transmission provided by all nodes of the content source";

B2. If $(MU_1+ \ldots +MU_N)* U_{bass}+L*D \geq f(N*D)$, properly increasing the transmission rate D when it is possible and required; properly decreasing L when it is possible and required;

C2. If $(MU_1+ \ldots +MU_N)* U_{bass}+L*D \leq f(N*D)$, and $(MU_1+ \ldots +MU_N)* U_{bass}+$the summation of maximum upload bandwidth for transmitting the content provided by all nodes for the content source$\geq f(N*D)$, and maintaining the original transmission rate is required, then properly increasing the number L of the content stream transmitted from the source end;

D2. If $(MU_1+ \ldots +MU_N)* U_{bass}+$the summation of maximum upload bandwidth for transmitting the content provided by all nodes for the content source$\leq f(N*D)$, and D can be decreased, then properly decreasing D.

When $(MU_1+ \ldots +MU_N)* U_{bass}+L*D \leq f(N*D)$ and transmission rate is fixed and cannot be changed, it includes one or more of the following step(s):

a. When data dropping is permitted, then discarding the content failed to be transmitted in time;

FIELD OF THE INVENTION b. During multi-bit encoding content transmission, if there are contents at lower rate to be transmitted, then selecting them to access;

c. Dealing with it according to transmission failure.

For achieving the objectives mentioned above, this invention also discloses a device for controlling content to stream on P2P network, comprising a content block generating module, for dividing the content to be transmitted into a plurality of blocks; a detection module, for supervising and controlling the connection state of the nodes transmitting the content; transmission parameter calculating module, for calculating each node's upload rate coefficient $MU_j$, the selected upload rate coefficient $U_j$, transmission rate D of the content stream and transmitted content stream number L of the content source, in which, j=1,2, . . . N, N indicates the number of nodes transmitting the content, the said upload rate coefficient $MU_j$ equals to the maximum upload rate permitted for content transmission divided by the base rate $U_{bass}$, the said selected upload rate coefficient $U_j$ simultaneously satisfies the following two formulas:

$$(U_1+ \ldots +U_N)*U_{bass}+L*D \geq f(N*D)$$

$$U_j \leq MU_j$$

In the formulas above, f (N*D) is the function relating to N*D, and is the bandwidth required for total download; and D$\leq$maximum transmission rate of content stream used by content source when transmitting one content stream;

L*D$\leq$summation of the maximum upload bandwidth for the content transmission provided by all nodes of the content source;

The content block distribution module is used for distributing the content blocks able to be transmitted by each node proportionally according to the selected upload rate coefficient; the transmission module is used for transmitting the distributed the content blocks of each node to the corresponding nodes; the node transmission control module is used for retransmitting the received content blocks to the other nodes.

The said transmission parameter calculating module consists of the upload rate coefficient calculating unit and the selected upload rate coefficient calculating unit; the said upload rate coefficient calculating unit receives the maximum upload rate of each node permitted for content transmission which is detected by detection module, and calculates the upload rate coefficient of each node; the said upload rate coefficient is the ratio of the upload rate coefficient to the base rate; the said selected said upload rate coefficient calculating unit distributes one selected upload rate coefficient according to the upload rate coefficient calculated by the upload rate coefficient calculating unit.

Further, the said transmission parameter calculating module is composed of a unit for calculating transmission rate D of content stream and a unit for calculating the number L of content stream from the content source.

It also consists of a Quality of Service module. The Quality of Service module is used for reporting the detected problem during transmission to the detection module.

For achieving the objectives mentioned above, this invention also discloses a computer readable medium with computer executable program. The program embedded on the said medium can accomplish the following functions:

Dividing the content to be transmitted into different blocks; Detecting the connection state of all nodes transmitting the content, including the maximum upload rate permitted for content transmission of each node, in which calculating upload rate coefficient $MU_j$ of each node: the said upload rate coefficient $MU_j$ equals to the maximum upload rate permitted for content transmission divided by the base rate $U_{bass}$, the selected upload rate coefficient $U_j$ of each node is determined based on upload rate coefficient $MU_j$, herein, j=1,2, . . . N, N indicates the number of nodes transmitting the content and determining transmission rate D of the content stream and the number L transmitted content stream from the content source, the said transmission rate D of the content stream and the number L of the content stream transmitted from the content source can be variable or fixed depending on different conditions, the said selected upload rate coefficient $U_j$ simultaneously satisfies the following two formulas:

$$(U_1+ \ldots +U_N)*U_{bass}+L*D \geqq f(N*D)$$

$$U_j \leqq MU_j$$

In the formulas above, f (N*D) is the function relating to N*D, and is the bandwidth required for total download; and D≦maximum transmission rate of content stream used by content source when transmitting one content stream;

L*D≦summation of maximum upload bandwidth for the content transmission provided by all nodes of the content source;

The content source uploads the content at the rate of L*D;

The content source distributes the content blocks being able to be transmitted by each node proportionally according to the selected upload rate coefficient of each node;

Respectively transmitting the distributed content blocks to the corresponding nodes, and controlling the nodes to retransmit the received blocks to the other nodes.

For achieving the objectives mentioned above, this invention also discloses an executable program used for server computer. The said program can complete the followings though the computer:

Dividing the content to be transmitted into different blocks;

Detecting the connection state of all the nodes transmitting the content, including the maximum upload rate permitted for content transmission of each node, calculate upload rate coefficient $MU_j$ of each node, the said upload rate coefficient $MU_j$ equals to the maximum upload rate permitted for content transmission divided by the base rate $U_{bass}$, the selected upload rate coefficient $U_j$ of each node is determined based on upload rate coefficient $MU_j$, in which, j=1,2, ... N, N indicates the number of nodes transmitting the content and determines transmission rate D of the content stream and transmitted content stream number L of the content source, the said transmission rate D of the content stream and transmitted content stream number L of the content source can be variable or fixed depending on different conditions, the said selected upload rate coefficient $U_j$ simultaneously satisfies the following two formulas:

$$(U_1+ \ldots +U_N)*U_{bass}+L*D \geqq f(N*D)$$

$$U_j \leqq MU_j$$

In the formulas above, f (N*D) is the function relating to N*D, which is the bandwidth required for total download; and D≦maximum transmission rate of content stream used by content source when transmitting one content stream;

L*D≦summation of maximum upload bandwidth for the content transmission provided by all the nodes of content source;

The content source uploads the content at the L*D rate;

The content source distributes the content blocks being able to be transmitted by each node proportionally according to the selected upload rate coefficient of each node;

The distributed content blocks are respectively transmitted to the corresponding nodes, and the nodes are controlled to retransmit the received content blocks to the other nodes.

Beneficial effects of the invention: 1) By taking use of the selected upload rate coefficient, this invention makes the number of content blocks distributed to the nodes which are able to be transmitted is proportional to the selected upload rate coefficient. The selected upload rate coefficient is determined based on the comprehensive condition of the network, so that it enables the members can provide the upload bandwidth for satisfying single member's download as possible. Only in case of insufficient capability of some members, it is undertaken cooperatively by the members with excessive upload bandwidth and the content source. In this way, the sources of each node can be more reasonably and fully used and P2P network content transmission rate and traffic can be enhanced. 2) Transmission rate D of the content stream and the number L of content stream transmitted from the content source can be regulated according to particular situation, in this way, it can not only reasonably and fully take use of P2P resource to transmit the content, but also maintain the content transmission through the said regulation in case of network changing.

The features and advantages of the invention are illustrated in more detail by reference to the following embodiments and accompanying figures.

DETAIL DESCRIPTION OF THE INVENTION

The principle of this invention is as following:

Supposing that in a certain period a rate of one content stream transmitted from a content source is D, and a rate for a node receiving the content block from either the source or other nodes, i.e. the download rate, should be equal to D.

Users can add the content transmission at different rates according to their network connecting capability, supposing that the network connection of the node asking for content transmission service should satisfy the requirements for download of this steaming media. Then, as for transmission of content to a group (group means a group of members), the download rate of each member of the group should be the same at D. If D is variable, D can not be larger than the lowest rate of each member of the group, in which maximum D is represented by $D_{max}$.

The basic conditions satisfying P2P transmission are:

Summation of upload rate provided by each member (receiving the content)+summation of upload bandwidth for content transmission provided by all the nodes of the content source≧bandwidth required for total download.

Herein, the upload bandwidth provided by the content source (either a node or a group of nodes) is supposed to be L*D, meaning that the content source can provide the number L of content stream at D rate.

The content stream means the transmitted content data at a rate (e.g. D).

According to the basic conditions for P2P transmission, the solution for P2P transmission becomes: seeking suitable L and D, and respectively appointing the member (receiving the content) to provide upload service at a suitable rate for the member.

During the transmission in which the content is divided into blocks, node upload service embodies in the transmission of the content blocks.

Appointing the member to provide upload service at a suitable rate of the member is accomplished through distributing a different number of content blocks to the different members for transmission.

In particular, for the group receiving the content, the base rate is represented by $U_{bass}$. Generally, $U_{bass}$ is the rate of transmitting a content package (wherein it is a full package, which is the packaged content block at maximum length) within a certain period (e.g. the length of the content package is 800 bytes, the time is 1 second, then $U_{bass}$=800 byte/second). calculate the multiple with $U_{bass}$ for the maximum upload rate able to used for content transmission of the users in this group, the maximum upload rate (This rate is not definitely the maximum upload rate of the node) able to be used for content transmission, calculate out that the upload rate coefficient for the node with user code of j:

$MU_j$=maximum upload rate of j used for content transmission/$U_{bass}$ $U_j$ is the selected upload rate coefficient for user j in this invention, and it can be a value ranging 0 (included) to $MU_j$. If user is required to retransmit the content block, during a certain period, the system distributes content block proportionally to j according to $U_j$.

Supposing that the content is transmitted to N nodes, the content transmission must satisfy the following conditions:

$$(U_1+\ldots+U_N)*U_{bass}+L*D \geq f(N*D)$$

Herein, $U_j \leq MU_j$; $D \leq D_{max}$; $L*D \leq$ summation of the maximum upload bandwidth for content transmission provided by all the nodes of the content source; f (N*D) is the function relating to N*D, which is the bandwidth required for total download.

$U_j$, L and D are respectively variable or fixed.

By changing one or more parameter(s) of $U_j$, L and D, the content transmission in various conditions can be realized.

Herein, $(U_1+\ldots+U_N)*U_{bass}$ indicates the summation of upload rate provided by each member (receiving the content). The appointed upload rate of node j is $U_j * U_{bass}$. It should be noted that there may be various methods to distribute content blocks to nodes for uploading. It is preferred that content blocks are distributed according to $U_j$. However, all the methods should make the nodes provide uploading service at the appointed rate.

Furthermore, the principle of selecting $U_j$ is: to enable the members to provide the upload bandwidth for satisfying single member's download as possible. It means to conform to the following principle: select $U_j=MU_j$ when $MU_j*U_{bass} \leq D$; if $U_j*U_{bass} \geq D$, select $U_j$ when $MU_j*U_{bass}>D$. Only in case of insufficient capability of some members, it is undertaken cooperatively by the members with excessive upload bandwidth and the content source.

Figure 1:
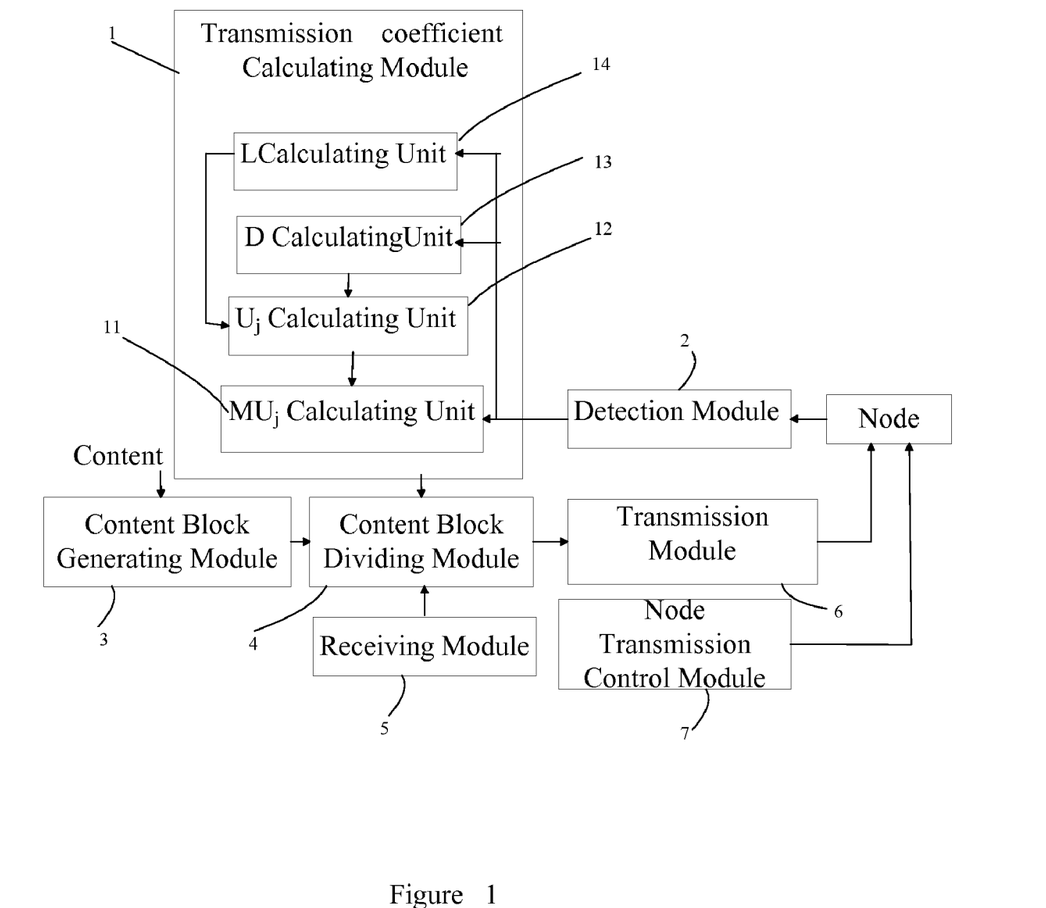
FIG. 1 is a structured block diagram of an embodiment of the invention.

Embodiment 1: FIG. 1 shows a structured block diagram of a server according to one embodiment of this invention. Detection module 2 supervises and controls the changes of user accessing, exiting or user's network connection state. Transmission coefficient calculating module 1 calculates the transmission parameters based on the data detected by detection module 2. The transmission parameters include upload rate coefficient $MU_j$, selected upload rate coefficient $U_j$, transmission rate D of content stream and the number L of the content stream transmitted from the content source. Accordingly, transmission coefficient calculating module 1 further includes unit 11 for calculating upload rate coefficient, unit 12 for calculating selected upload rate coefficient, unit 13 for calculating transmission rate D of the content stream and unit 14 for calculating the number of content stream transmitted from the content source. According to the maximum upload rate used for content transmission on the node j detected by detection module 2 and the base rate $U_{bass}$, unit 11 for calculating upload rate coefficient calculates the upload rate coefficient $MU_j$. In addition, based on the result detected from the detection module 2, unit 13 for calculating transmission rate of the content stream and unit 14 for calculating the number of content stream transmitted from the content source determine transmission rate D of content stream and the number L of content stream transmitted from the content source. The transmission rate D of content stream and number L of content stream transmitted from the content source can be variable or fixed depending on different transmission conditions, the calculation includes the following steps: firstly determining the range of the said transmission rate D of the content stream and the number L of content stream transmitted from the content source (the range of D if L is fixed, or the range of L if D is fixed) by using the condition that "D≦Dmax" and "L*D≦summation of maximum upload bandwidth for the content transmission provided by all the nodes for the content source"; adjusting the said the said transmission rate D of the content stream and the number L of content stream transmitted from the content source depending on different transmission conditions, that is to say, if $(MU_1+\ldots+MU_N)* U_{bass}+L*D \geq f(N*D)$ and increasing transmission rate D is required, then properly increasing the transmission rate D; if $(MU_1+\ldots+MU_N)* U_{bass}+L*D \leq f(N*D)$ and $(MU_1+\ldots+MU_N)* U_{bass}$+summation of maximum is upload bandwidth for content transmission provided by all the nodes for the content source≧f (N*D), and original transmission rate should be kept, then properly increasing the number L of the content stream transmitted from the source end. Content block generating module 3 divides the content to be transmitted into blocks and marks each content block; According to the transmission coefficient outputted from transmission coefficient calculating module 1, content block distributing module 4 distributes proportionally the content blocks divided by content block generating module 3 or the content blocks received by content block receiving module 4 to each node for transmission. The distribution method is that the number of the content blocks distributed to each node for transmission is proportional to the selected upload rate coefficient $U_j$. Transmission module 6 respectively transmits the content blocks distributed to each node for transmission by content block distributing module 4 to the corresponding nodes.

Figure 2:
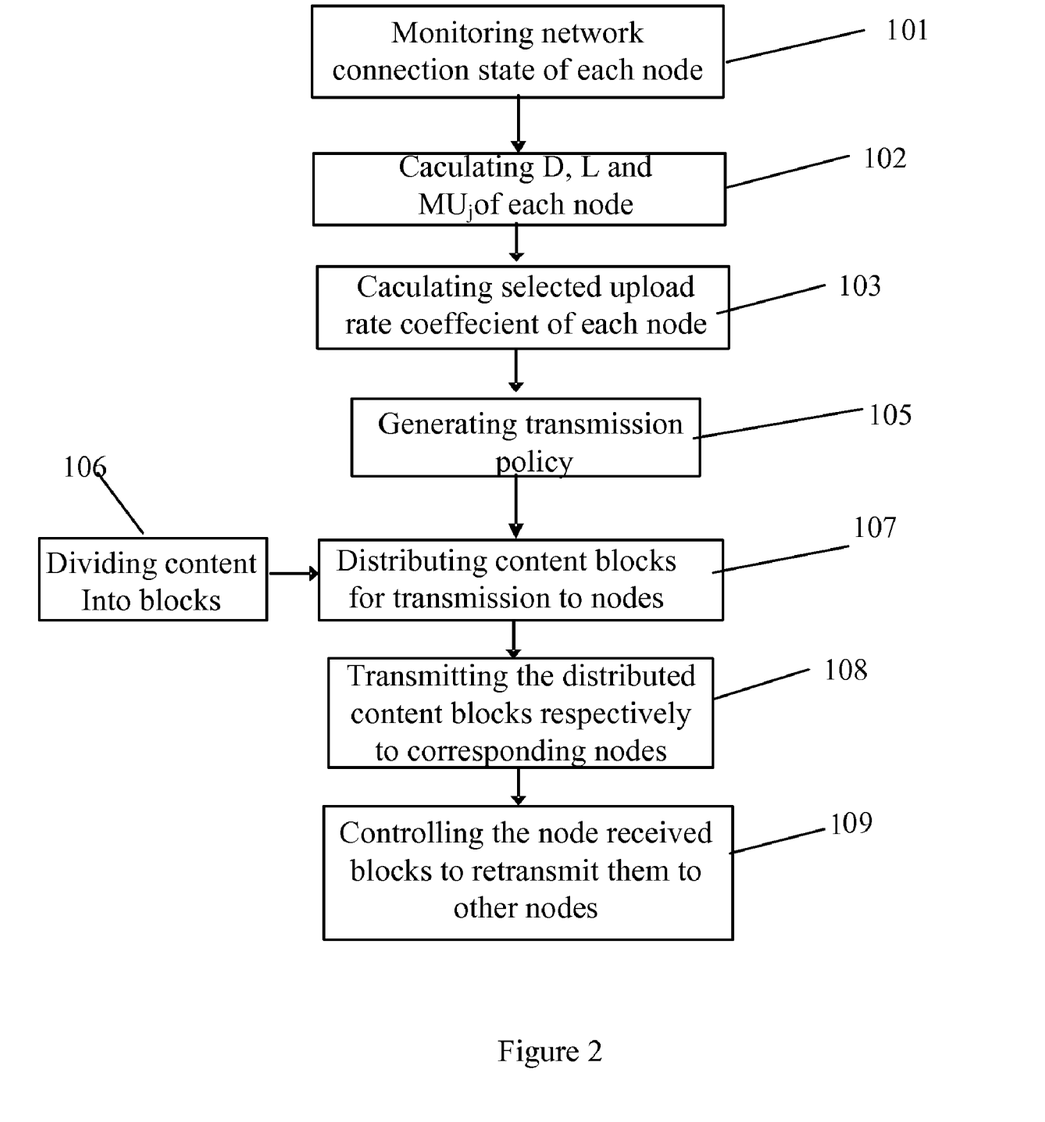
FIG. 2 is a flow chart of an embodiment of the invention.

As shown in FIG. 2, it is a flow chart of one embodiment of this invention, consisting of the following steps:

In step 101, the detection module monitors and controls the change of access, exit and network connection state of each node regularly. Once it occurs to a new user accessing or user exiting, the detection module will detect the network connection parameters. If there are changes of the network connection state, the detection module will also detect the network connection parameters, which are used in the following steps, and then performing step 102;

In step 102, according to the network connection state of each node, calculating the upload rate coefficient $MU_j$ (j=1, 2, N, N indicates the number of all nodes participating in the content transmission), transmission rate D of the content stream and the number L of the content stream transmitted from the content source. The upload rate coefficient is the ratio of the maximum upload rate of node for content transmission to the base rate $U_{bass}$. Calculating the multiple of maximum upload rate of node for content transmission with $U_{bass}$, and then obtaining upload rate coefficient of node j:

$MU_j$=maximum upload rate of node j for content transmission/$U_{bass}$

Then performing step 103;

In step 103, distributing the selected upload rate coefficient for this node based on the upload rate coefficient, and then performing step 105;

In step 105, generating transmission policy based on the selected upload rate coefficient, transmission rate D of the content stream and the number L of the content stream transmitted from the content source, and then performing step 107;

In step 107, distributing the content block proportionally generated by step 106 to each node according to the selected upload rate coefficient, the content block number distributed to each node for transmission is proportional to the selected upload rate coefficient of each node given by the server. And then performing step 108;

In step 108, the content source respectively transmits the content block distributed to each node at the rate of L*D to the corresponding nodes, transmission technology can be P2P transmission, and then step 109 is performed;

In step 109, the node controlling the content block received retransmits to other nodes, in which the transmission technology can be P2P transmission.

Figure 3:
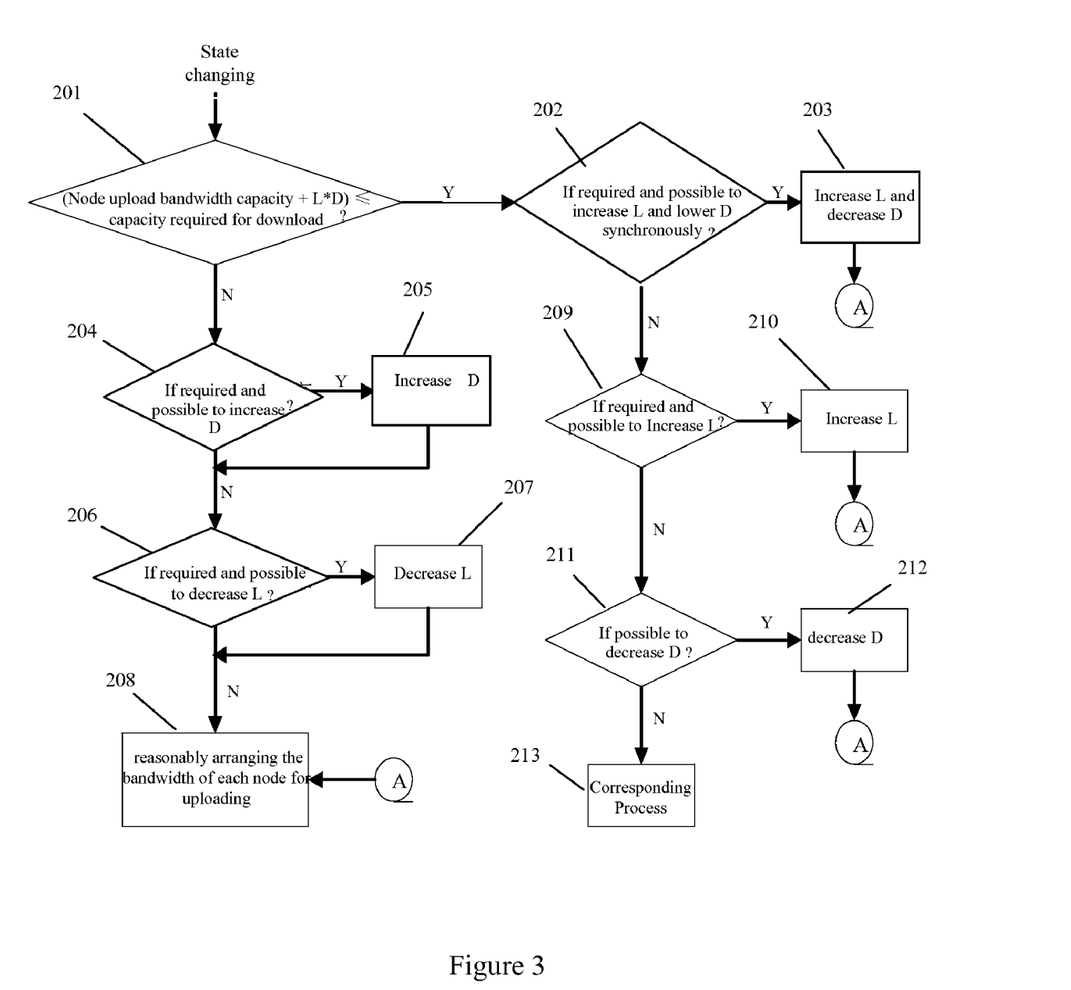
FIG. 3 is a flow chart of setting transmission parameter of an embodiment of the invention.

The content source can be one or more node(s). During transmission, the transmission rate D of the content stream and the number L of content stream transmitted from the content source can be variable or fixed according to particular transmission condition. The regulation flow is shown as FIG. 3 including the following steps:

In step 201, In case of changes of transmission state, judging if (node upload bandwidth capacity+L*D) is smaller than or equal to the capacity required for download, i.e. judging if $(MU_1+\ldots+MU_N)* U_{bass}+L*D \leq f(N*D)$. If yes, performing step 202; if not, then performing step 204;

In step 202, judging if it is possible to increase the number L of content stream transmitted from the content source and to decrease the transmission rate D of the content stream simultaneously and if this is required. If yes, performing step 203; if not, performing step 209;

In step 203, increasing the number L of content stream transmitted from the content source and decreasing the transmission rate D of the content stream, and then performing step 208;

In step 204, when it is possible to increase the transmission rate D of the content stream and this is required, performing step 206; if the transmission rate D of the content stream can not be increased, performing step 207 for decreasing the number L of content stream transmitted from the content source, and then performing step 208;

In step 208, reasonably arranging the bandwidth of each node for uploading;

In step 209, judging if it is possible to increase the content stream number L of the content source and this is required. If yes, performing step 210, and if not, performing step 211;

In step 210, increasing the number L of content stream transmitted from the content source, and then performing step 208;

In step 211, judging if it is possible to decrease the transmission rate D of the content stream and this is required. If yes, performing step 212 and decreasing the transmission rate D of the content stream, and then perform step 208; if not, performing step 213 for corresponding treatment meaning the followings:

When $(MU_1+\ldots+MU_N)* U_{bass}+L*D \leq f(N*D)$ and the transmission rate is fixed, it consists of one or more step(s) of the followings:

a. When data dropping is permitted, then discarding the content failed to be transmitted in time;

b. During multi-bit encoding content transmission, if there are contents at lower rate to be transmitted, then selecting them to access;

c. Dealing with it according to transmission failure.

To increase/decrease L is to increase/decrease the upload bandwidth of the server, in which the bandwidth of server is a rare resource. When user has sufficient upload capacity, it is preferred to decrease L as possible. This is one of the objectives of P2P (using the capacity of node as possible to reduce the function of server). To increase/decrease D is to increase/decrease content transmission rate. If conditions are permitted, the faster the rate is, the better it is for users.

Figure 4:
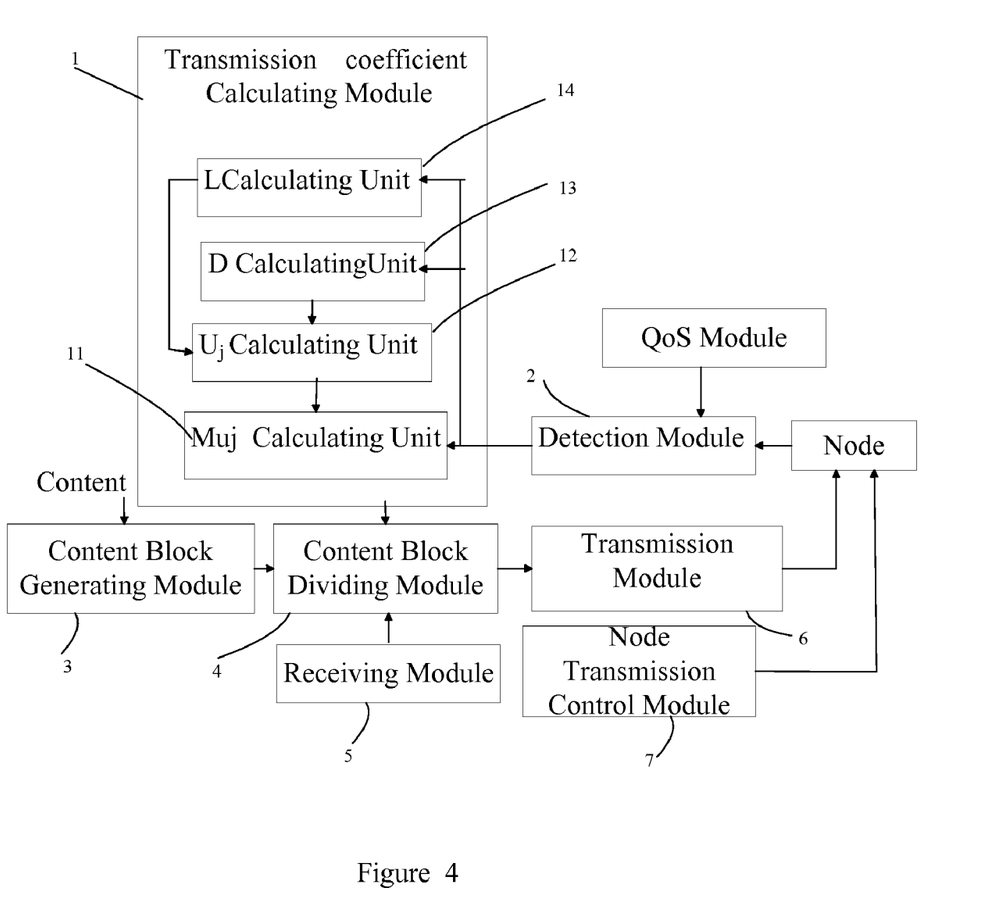
FIG. 4 is a structured block diagram of another embodiment of the invention.

The embodiment 2: as shown in FIG. 4, based on embodiment 1, a Quality of Service module is also included. If the Quality of Service module detects problems during transmission, it will report them to the detection module 2. The detection module 2 needs to check the connection state of each node for calculating the transmission parameters again.

Figure 5:
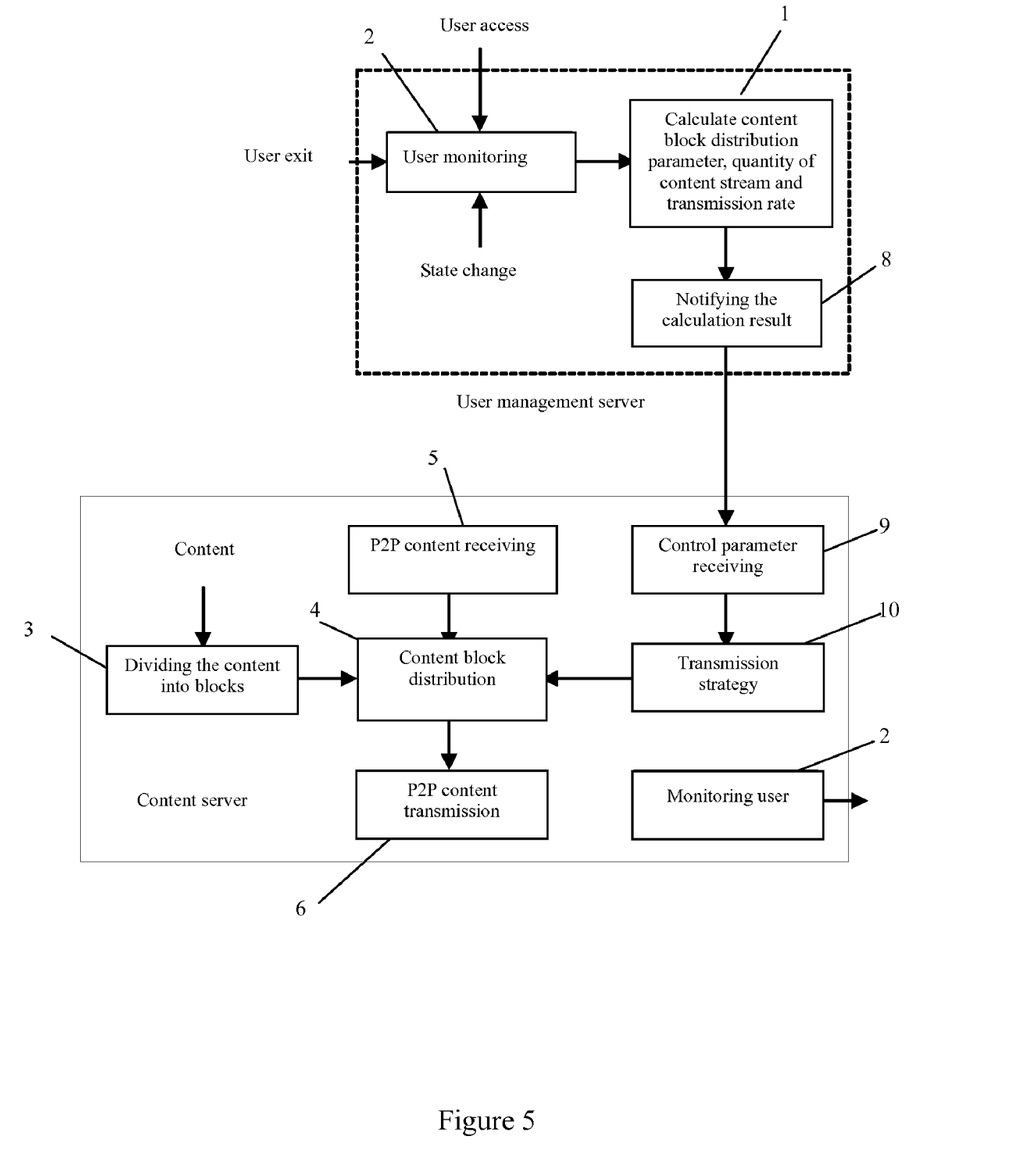
FIG. 5 is a structured block diagram of a server divided into two parts according to the invention.

As shown in FIG. 5, it is a structured block diagram of the server side according to one embodiment of this invention. At the server side, it can be divided into an area of user management server and an area of content server according to different functions. The area of user management server includes detection module 2, transmission parameter calculating module 1 and calculated result notifying module 8. The area of content server consists of control parameter receiving module 9, transmission policy generating module 10, content block distributing module 4, content block generating module 3, receiving module 5, transmission module 6 and detection module 2.

The following is another embodiment of this invention. A server divides the login nodes into one or more group(s) establishes a control data set for each group. Relying on the control data set, the server calculates upload rate coefficients for all the members in this group, depending on which the server distributes and transmits the contents. For particular realization, the following method can be applied:

When $(MU_1+\ldots+MU_N)* U_{bass}+L*D \geq f(N*D)$, meaning that each node has excessive upload bandwidth and keeps the original transmission rate, then adopting the following implementation:

For better explanation, it is simplified to take transmitting one content block as unit of the rate. Supposing that there are N members in the group, within certain time t, N members require to totally download the number M of content blocks. In the same way, the upload rate is that $U_{bass}$ member uploads one content block within the time t.

Select $SU_j=MU_j$ if $MU_j*U_{bass} \leq D$, select $SU_j=D/U_{bass}$ if $MU_j*U_{bass} < D$. $SU_j$ represent the bandwidth coefficient for satisfying its downloading as possible.

Firstly, each member has transmitted the number $SU_j$ of content blocks, then the number of residual blocks to be transmitted is indicated as M'.

Then, more content blocks are distributed to the members with excessive upload capacity:

$U_j'=(MU_j-SU_j)$/summation of the residual upload rate coefficients of all the members *M'

$$U_j=U_j'+SU_j$$

In this way, $U_j(j=1, 3, \ldots, N)$ are obtained. Within time t, the node j requires to upload the number $U_j$ of content blocks.

Another simplified effective method is:

Adding up the number $M_1$ of members which the upload rate coefficient is 1, and the number $M_2$ of members which the upload rate coefficient is 2, and so on. When distributing, distributing one content block to each member which is able to upload ($MU_j \geq 1$) first. If the distributed blocks are insufficient, one more content block is distributed to the member ($MU_j \geq 2$) with excessive capability. If the distributed blocks are still insufficient, one more content block is distributed further to the member ($MU_j \geq 3$) with excessive capability, and so on.

From $M_1$, $M_2$, ... $Mk$ can be calculated, that is to say the minimum k can be found. It makes $$(M_1+M_2+\ldots M_k) \geq M$$

After worked out k, the node j requires to upload the content blocks which number is the smaller in $MU_j$ and k.

In this way, for the nodes with upload capacity, they can upload the content blocks according to their upload capacity without extra help of other nodes, accordingly, this reduces the excessive load on the other nodes and more reasonably uses the network bandwidth.

The modules or flows mentioned above can be programmed. This program can be embedded on a computer, including a server computer.

The program designed according to the modules or flows mentioned above can be stored in the external readable storage medium. The storage medium can be floppy disk, CD-ROM, hard disk, tape recoding medium, semiconductor IC card or other optical recording mediums (e.g. DVD or PD), or magnetic recording medium. The server system providing network connection can also be used as the readable medium for recording the said program.

What is claimed is:

1. A method for realizing content flowing continuously on P2P network comprising the following steps:

A1. dividing a content to be transmitted into different blocks;

B1. detecting connection states of all nodes transmitting the content, including a maximum upload rate permitted for the content transmission of each node, in which an upload rate coefficient $MU_j$ of each node is calculated, the upload rate coefficient $MU_j$ equals to the maximum upload rate permitted for content transmission divided by a base rate $U_{bass}$, the selected upload rate coefficient $U_j$ of each node is determined based on the upload rate coefficient $MU_j$, wherein, j=1,2,....N, N indicates the number of nodes transmitting the content, a transmission rate D of content streams and transmitted content stream number L of the content source are determined, the transmission rate D of the content stream and transmitted content stream number L of the content source can be variable or fixed depending on different conditions, the selected upload rate coefficient $U_j$ simultaneously satisfies the following two formulas:

$$(U_1+\ldots+U_N)*U_{bass}+L*D \geq f(N*D)$$

$$U_j \leq MU_j$$

in the formulas above, f (N*D) is a function relating to N*D, which is a bandwidth required for total download; and D≦maximum transmission rate of content stream used by content source when transmitting one content stream;

L*D≦summation of maximum upload bandwidth for a content transmission provided by all nodes of content sources;

C1. the content source distributes the content blocks being able to be transmitted by each node proportionally according to the selected upload rate coefficient of each node;

D1. the content source respectively transmits the distributed content blocks to the corresponding nodes at L*D rate, and controls the nodes to retransmit the content blocks received to the other nodes.

2. The method for realizing content flowing continuously on P2P network according to claim 1, wherein in the step C1 and D1, the nodes transmit the content blocks according to the selected upload rate coefficient.

3. The method for realizing content flowing continuously on P2P network according to claim 1, wherein in the step B1, the selected upload rate coefficient $U_j$ of each node is determined based on the following conditions: select $U_j=MU_j$ when $MU_j*U_{bass} \leq D$; when $MU_j*U_{bass} > D$, the selected $U_j$ should satisfy $U_j*U_{bass} \geq D$.

4. The method for realizing content flowing continuously on P2P network according to claim 3, wherein when $(MU_1+\ldots+MU_N)*U_{bass}+L*D \geq f(N*D)$, an original transmission rate and a network upload bandwidth of the content source are maintained, the said step D1 includes the following steps:

D11. controlling nodes which selected upload rate coefficient is larger than or equal to 1 and with the capability of uploading the content blocks to distribute one block;

D12. calculating a residual selected upload rate coefficient of each node: the residual selected upload rate coefficient equals to the distributed content block number of this node subtracted from the selected upload rate coefficient;

D13. if there are residual content blocks to be uploaded, performing step D14;

D14. controlling the nodes which residual selected upload rate coefficient is larger than or equal to 1 and with the residual upload capability block to distribute one block;

D15. repeating to perform step D12-D14 until all the content blocks are distributed.

5. The method for realizing content flowing continuously on P2P network according to claim 3, wherein when $(MU_1+\ldots+MU_N)*U_{bass}+L*D \geq f(N*D)$ and the original transmission rate and the network upload bandwidth of a content source are maintained, the step D1 includes the following steps:

D11'. calculating the bandwidth coefficient $SU_j$ which is satisfied the requirement for its downloading as possible: $SU_j=MU_j$ when $MU_j*U_{bass} \leq D$, $SU_j=D/U_{bass}$ when $MU_j*U_{bass}>D$;

D12'. calculating $U_j'$ according to the formula $U_j'=(MU_j-SU_j)$/sum of residual upload rate coefficient for all the members * the number of residual blocks to be uploaded;

D13'. calculating $U_j'$ according to the formula $U_j'=U_j'+SU_j$;

D14'. member j (j=1, 2, ... , N) distributes the content blocks with $U_j$.

6. The method for realizing content flowing continuously on P2P network according to claim 1, wherein in the step B1, regularly detecting the connection state of each node, calculating the selected upload rate coefficient $U_j$, transmission rate D of the content stream and the number L of content stream transmitted from the content source.

7. The method for realizing content flowing continuously on P2P network according to claim 6, wherein the step B1 consists of the following steps: use Quality of Service, when problem is detected during transmission, it inspects the connection state of each node, calculates the selected upload rate coefficient $U_j$, transmission rate D of the content stream and the number L of content stream transmitted from the content source for each node.

8. The method for realizing content flowing continuously on P2P network according to claim 7, wherein the transmission rate D of the content stream and the number L of content stream transmitted from the content source can be variable or fixed depending on different conditions, the calculation of the said transmission rate D of the content stream and the number L of content stream transmitted from the content source includes the following steps:

A2. calculating the range of the said transmission rate D of the content stream and the number L of content stream transmitted from the content source by using the condition that D≦transmission rate of maximum content stream used by the content source when transmitting one content stream and L*D≦summation of maximum upload bandwidth for the content transmission provided by all nodes of the content source;

B2. on the condition of $(MU_1 + \ldots + MU_N) * U_{bass} + L*D \geq f(N*D)$, then properly increasing the transmission rate D if it is possible and required; properly decreasing L if possible and required;

C2. if $(MU_1 + \ldots + MU_N) * U_{bass} + L*D \leq f(N*D)$, and $(MU_1 + \ldots + MU_N) * U_{bass}$ +the summation of maximum upload bandwidth for transmitting the content provided by all nodes for the content source≧f (N*D), and maintaining the original transmission rate is required, then properly increasing the number L of the content stream transmitted from the source end;

D2. if $(MU_1 + \ldots + MU_N) * U_{bass}$ +the summation of maximum upload bandwidth for transmitting the content provided by all nodes for the content source≦f (N*D), and D can be decreased, then properly decreasing D.

9. The method for realizing content flowing continuously on P2P network according to claim 7, wherein when $(MU_1 + \ldots + MU_N) * U_{bass} + L*D \leq f(N*D)$ and transmission rate is a fixed, it includes one or more of the following step(s):

a. if data dropping is permitted, then discarding the content failed to be transmitted in time;

b. during multi-bit encoding content transmission, if there are contents at lower rate to be transmitted, then selecting them to access;

c. dealing with it according to transmission failure.

10. The method for realizing content flowing continuously on P2P network according to claim 7, wherein the said content source is one or more node(s).

11. A device for controlling contents to stream on P2P network comprising:

a content block generating module, used for dividing a content to be transmitted into a plurality of blocks;

a detection module, used for supervising and controlling connection state of nodes transmitting the content;

a transmission parameter calculating module, used for calculating each node's upload rate coefficient $MU_j$, a selected upload rate coefficient $U_j$, a transmission rate D of the content stream and the number L of content stream transmitted from a content source, wherein, j=1,2, . . . N, N indicates the number of nodes transmitting the content, the said upload rate coefficient $MU_j$ equals to the maximum upload rate permitted for content transmission divided by the base rate $U_{bass}$, the said selected upload rate coefficient $U_j$ simultaneously satisfies the following tow formulas:

$$(U_1 + \ldots + U_N) * U_{bass} + L*D \geq f(N*D)$$

$$U_j \leq MU_j$$

wherein, f(N*D) is the function relating to N*D, and is the bandwidth required for total download; and D≦maximum transmission rate of content stream used by content source when transmitting one content stream;

L*D≦summation of the maximum upload bandwidth for the content transmission provided by all nodes of the content source;

a content block distribution module, used for distributing the content blocks able to be transmitted by each node proportionally according to the selected upload rate coefficient;

a transmission module, used for transmitting the distributed the content blocks of each node to the corresponding nodes;

a node transmission control module, used for controlling the nodes received content blocks to retransmit them to the other nodes.

12. The device for controlling content to stream on P2P network according to claim 11, wherein the said transmission parameter calculating module consists of the upload rate coefficient calculating unit and the selected upload rate coefficient calculating unit; the said upload rate coefficient calculating unit receives the maximum upload rate of each node permitted for content transmission which is detected by detection module, and calculates the upload rate coefficient of each node; the said upload rate coefficient is the ratio of the upload rate coefficient to the base rate; the said selected upload rate coefficient calculating unit distributes one selected upload rate coefficient according to the upload rate coefficient calculated by the upload rate coefficient calculating unit.

13. The device for realizing content flowing continuously on P2P network according to claim 12, wherein the said transmission parameter calculating module is composed of an unit for calculating transmission rate D of the content stream and an unit for calculating the number L of the content stream from the content source.

14. The device for realizing content flowing continuously on P2P network according to claim 13, wherein it also consists of the Quality of Service module. The said Quality of Service module is used for reporting the detected problem during transmission to the detection module.

15. A computer non-transitory readable medium with a computer executable program, the program embedded on the said medium is executed by the computer to accomplish the method according to claim 1.

16. An executable program used for non-transitory readable medium used for server computer, the program is executed by the computer to accomplish the method according to claim 1.

* * * * *